(12) United States Patent
Masuda et al.

(10) Patent No.: US 8,559,131 B2
(45) Date of Patent: Oct. 15, 2013

(54) PERPENDICULAR MAGNETIC RECORDING MEDIA AND MAGNETIC DISC APPARATUS

(75) Inventors: Daisuke Masuda, Tokyo (JP); Chiyo Saito, Tokyo (JP); Junichi Horikawa, Tokyo (JP); Iwao Okamoto, Singapore (SG)

(73) Assignee: WD Media (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/161,394

(22) Filed: Jun. 15, 2011

(65) Prior Publication Data

US 2012/0162808 A1     Jun. 28, 2012

(30) Foreign Application Priority Data

Jun. 16, 2010   (JP) ................................. 2010-137110

(51) Int. Cl.
*G11B 5/127*     (2006.01)

(52) U.S. Cl.
USPC ...................................... 360/125.1

(58) Field of Classification Search
USPC .................. 369/13.56, 13.02, 13.25; 360/59, 360/125.31, 125.74, 31, 135, 75, 125.03, 360/125.1, 69, 70
See application file for complete search history.

(56) References Cited

U.S. PATENT DOCUMENTS

| 7,221,530 | B2 * | 5/2007 | Tomiyama et al. | 360/55 |
| 7,372,656 | B2 * | 5/2008 | Satoh et al. | 360/69 |
| 8,076,013 | B2 * | 12/2011 | Sonobe et al. | 428/827 |
| 8,223,458 | B2 * | 7/2012 | Mochizuki et al. | 360/125.1 |

FOREIGN PATENT DOCUMENTS

| JP | 2007-115296 | 5/2007 |
| JP | 2007-115324 | 5/2007 |

OTHER PUBLICATIONS

Wood, et al., "The Feasibility of Magnetic Recording at 10 Terabits Per Square Inch on Conventional Media," IEEE Transactions on Magnetics, vol. 45, No. 2, Feb. 2009, pp. 917-923.
Shiroishi et al., "Future Options for HDD Storage," IEEE Transactions on Magnetics, vol. 45, No. 10, Oct. 2009, pp. 3816-3822.
Seigler, et al., "Integrated Heat Assisted Magnetic Recording Head: Design and Recording Demonstration," IEEE Transactions on Magnetics, vol. 44, No. 1, Jan. 2008, pp. 119-124.

* cited by examiner

*Primary Examiner* — Ali Neyzari

(57) ABSTRACT

[Problem] A perpendicular magnetic recording medium and a magnetic disk device that are suitable for a shingle recording type are provided.
[Solution] The perpendicular magnetic recording medium of the present invention is a perpendicular magnetic recording medium for a shingle recording type having a laminated film including a soft magnetic layer 13 and a main recording layer 16 formed on base 11, the soft magnetic layer 13 having a thickness found from a core width of a magnetic head for recording and reproduction with respect to the perpendicular magnetic recording medium and a track pitch narrower than the core width.

8 Claims, 13 Drawing Sheets

(a)

(b)

PERPENDICULAR MAGNETIC RECORDING MEDIA AND MAGNETIC DISC APPARATUS

TECHNICAL FIELD

The present invention relates to a perpendicular magnetic recording medium and a magnetic disk device for a shingle write type.

BACKGROUND ART

With an increase in capacity of information processing in recent years, various information recording technologies have been developed. In particular, the surface recording density of an HDD (a hard disk device) using magnetic recording technology is continuously increasing at an annual rate of approximately 50%. In recent years, an information recording capacity exceeding 500 gigabytes per disk has been desired for a magnetic disk with a 2.5-inch diameter for use in an HDD or the like. To fulfill such demands, an information recording density exceeding 700 gigabits per square inch is desired to be achieved.

Also in recent years, to further improve recording density, a perpendicular magnetic recording type is adopted for magnetizing a recording layer in a direction perpendicular to a magnetic disk plane. Under these circumstances, to further increase recording density of the magnetic disk, linear recording density (BPI: Bit Per Inch) in a circumferential direction and track recording density (TPI: Track Per Inch) in a diameter direction have to be both improved, while a predetermined S/N ration is ensured.

As a method of improving track recording density, there is a method of decreasing a track width by narrowing a recording head. However, when the recording head is narrowed, recording magnetic field density is decreased, thereby posing a problem such that a sufficient S/N ratio cannot be ensured. To get around this, as a method of solving this problem, a type (a shingle recording type) is suggested in which information is written in a partially overlapping manner in adjacent tracks (for example, refer to Patent Document 1 and Patent Document 2). By applying the shingle recording type, the recording head can be made large, thereby advantageously ensuring recording magnetic field density and ensuring an S/N ratio and also allowing achievement of a track narrower than a recording width actually written by an actual recording head.

PRIOR ART DOCUMENTS

Patent Documents

Patent Document 1: Japanese Unexamined Patent Application Publication No. 2007-115296
Patent Document 2: Japanese Unexamined Patent Application Publication No. 2007-115324

Non-Patent Documents

Non-Patent Document 1: IEEE TRANSACTIONS ON MAGNETICS, Vol. 45, No. 2, FEBRUARY 2009, pp. 917-923
Non-Patent Document 2: IEEE TRANSACTIONS ON MAGNETICS, Vol. 45, No. 10, October 2009, pp. 3816-3822

DISCLOSURE OF INVENTION

Problems to be Solved by the Invention

While track recording density can be improved by applying the shingle recording type, a perpendicular magnetic recording medium and a magnetic disk device that are suitable for this shingle recording type are desired.

The present invention has been made in view of the above, and has an object of providing a perpendicular magnetic recording medium and a magnetic disk device that are suitable for the shingle recording type.

Means for Solving the Problem

The perpendicular magnetic recording medium of the present invention is a perpendicular magnetic recording medium for a shingle recording type having a laminated film including a soft magnetic ground layer and a recording layer formed on a base, the soft magnetic ground layer having a thickness found from a core width of a magnetic head for recording and reproduction with respect to the perpendicular magnetic recording medium and a track pitch narrower than the core width.

In the magnetic head of the shingle recording type, compared with the magnetic head of a conventional recording type, a sufficient overwrite (OW) characteristic can be obtained due to a wide core width. Therefore, the OW characteristic can be ensured even when a soft magnetic ground layer (SUL) is eliminated or made extremely thin. Also, in the perpendicular magnetic recording medium, by eliminating the soft magnetic ground layer or making it extremely thin, the curvature of the track edge can be reduced and Spi-SNR (a recording and reproduction characteristic) can be improved.

In the perpendicular magnetic recording medium of the present invention, the thickness of the soft magnetic ground layer is preferably equal to or smaller than 40 nm.

In the perpendicular magnetic recording medium of the present invention, the thickness of the soft magnetic ground layer is preferably thinner than a thickness of a soft magnetic ground layer of a perpendicular magnetic recording medium for use in a recording type with a track pitch wider than the core width of the magnetic head by $2 \times d \times A$ (nm), wherein $d$ = the core width of the magnetic head - $TP\_shingle$, $A = (Bs\_mp/Bs\_sul) \times (SUL\_conv/TP\_conv)$, wherein $TP\_shingle$: the track pitch of the perpendicular magnetic recording medium for the shingle recording type $Bs\_mp$: saturation magnetic flux density of a main pole of the perpendicular magnetic recording medium for the shingle recording type $Bs\_sul$: saturation magnetic flux density of the soft magnetic ground layer of the perpendicular magnetic recording medium for the shingle recording type $SUL\_conv$: a thickness of the soft magnetic ground layer required for saturation of Spi-SNR in the perpendicular magnetic recording medium for a recording type with the track pitch wider than the core width of the magnetic head $TP\_conv$: the track pitch of the perpendicular magnetic recording medium for the recording type with the track pitch wider than the core width of the magnetic head.

A magnetic disk device of the present invention is a magnetic disk device including a perpendicular magnetic recording medium having a soft magnetic ground layer, a magnetic head for writing information in the perpendicular magnetic recording medium, and a control unit for controlling a write operation on the perpendicular magnetic recording medium of the magnetic head, wherein a core width of the magnetic head is wider than a track pitch of the perpendicular magnetic recording medium, and the soft magnetic ground layer has a thickness found a core width of the magnetic head and a track pitch narrower than the core width.

In the magnetic head of the shingle recording type, compared with the magnetic head of a conventional recording type, a sufficient overwrite (OW) characteristic can be obtained due to a wide core width. Therefore, the OW characteristic can be ensured even when a soft magnetic ground layer (SUL) is eliminated or made extremely thin. Also, in the perpendicular magnetic recording medium, by eliminating the soft magnetic ground layer or making it extremely thin, the curvature of the track edge can be reduced, Spi-SNR (a recording and reproduction characteristic) can be improved.

In the magnetic disk device of the present invention, the thickness of the soft magnetic ground layer is preferably thinner than a thickness of a soft magnetic ground layer of a perpendicular magnetic recording medium for use in a recording type with a track pitch wider than the core width of the magnetic head by 2×d×A (nm), wherein $d$=the core width of the magnetic head-$TP\_shingle$, $A=(Bs\_mp/Bs\_sul)\times(SUL\_conv/TP\_conv)$, wherein TP_shingle: the track pitch of the perpendicular magnetic recording medium for the shingle recording type Bs_mp: saturation magnetic flux density of a main pole of the perpendicular magnetic recording medium for the shingle recording type Bs_sul: saturation magnetic flux density of the soft magnetic ground layer of the perpendicular magnetic recording medium for the shingle recording type SUL_conv: a thickness of the soft magnetic ground layer required for saturation of Spi-SNR in the perpendicular magnetic recording medium for a recording type with the track pitch wider than the core width of the magnetic head TP_conv: the track pitch of the perpendicular magnetic recording medium for the recording type with the track pitch wider than the core width of the magnetic head.

Effect of the Invention

According to the present invention, since the thickness of the soft magnetic ground layer is set as a thickness found from the core width of the magnetic head for recording and reproduction with respect to the perpendicular magnetic recording medium and a track pitch narrower than this core width, a perpendicular magnetic recording medium and a magnetic disk device that are suitable for the shingle recording type can be achieved.

BEST MODES FOR CARRYING OUT THE INVENTION

Figure 1:
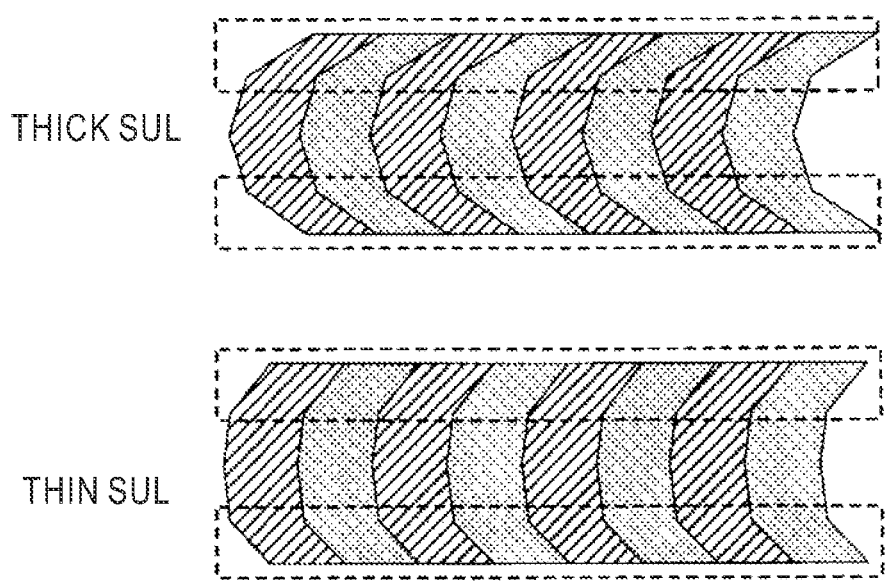
FIG. 1 A diagram for describing a relation between a thickness of a soft magnetic ground layer and a curvature of a track edge.

In the shingle recording type, since writing is performed in an overlapping manner at a track end little by little, the recording magnetization state of the track edge can be thought to have a significant influence on a recording and reproduction characteristic. To improve the recording and reproduction characteristic, the curvature of the track edge is required to be suppressed. The inventors focused attention on the fact that this curvature of the track edge relates to the film thickness of a soft magnetic ground layer and found that, as depicted in FIG. 1, the curvature of the track edge can be suppressed when the soft magnetic ground layer (SUL) is thin.

Figure 2:
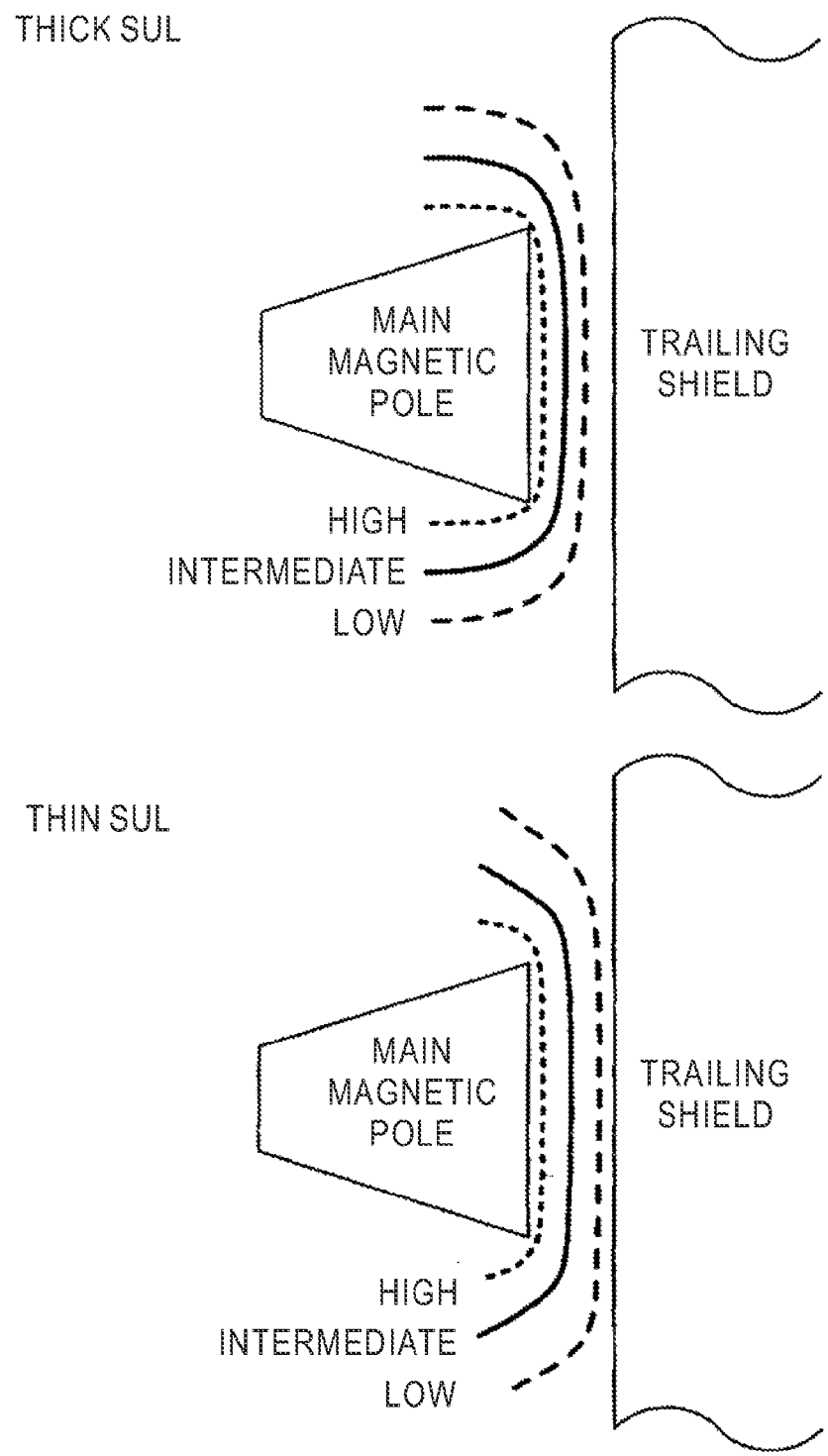
FIG. 2 A drawing for describing a curvature of a recording magnetic field.

The mechanism can be thought such that, with the soft magnetic ground layer being made thinner, components of a magnetic field occurring from a main pole and absorbed to a trailing shield side are increased and therefore the curvature of the recording magnetic field is decreased. FIG. 2 conceptually depicts that situation. In the drawing, high, intermediate, and low each represent a strength of an isodynamic line. When a mean magnetic field is taken as an inverted magnetic field of the medium, a bit boundary is defined by its isodynamic line. Now, isodynamic lines are when the soft magnetic ground layer is thick and it is thin are as depicted in the drawing. Because of the reason described above, a bit curvature at a main magnetic pole end is thought to be more suppressed when the layer is thin.

In the magnetic head of a recording type with a track pitch wider than a core width of the magnetic head (a conventional recording type), since the core width is relatively narrow, a relatively thick soft magnetic ground layer is provided in a perpendicular magnetic recording medium to ensure an overwrite (OW) characteristic. On the other hand, a magnetic head of the shingle recording type has a wide core width compared with a magnetic head of the conventional recording type, and therefore a sufficient overwrite (OW) characteristic can be obtained. Therefore, in a perpendicular magnetic recording medium for the shingle recording type, the OW characteristic can be ensured even when the soft magnetic ground layer (SUL) is eliminated or made extremely thin.

As such, in the shingle recording type, by using a perpendicular magnetic recording medium with a soft magnetic ground layer being eliminated or made extremely thin, the OW characteristic can be maintained while the curvature of the track edge is reduced, resulting in an improvement in Spi-SNR (a recording and reproduction characteristic).

In the following, an embodiment of the magnetic disk device of the present invention is described with reference to the drawing.

A magnetic disk device 10 depicted in the present embodiment has at least a magnetic disk 101, a recording head 102 for writing information in the magnetic disk 101, and a control unit 103 for controlling a write operation of the recording head 102 onto the magnetic disk 101. The magnetic disk 101 rotates at high speeds by a spindle motor 112 fixed to a casing 111. The recording head 102 is mounted on a suspension 113, and the suspension 113 is connected to a head arm 114 driven by a voice coil motor 115. The control unit 103 controls the voice coil motor 115 to position the recording head 102 at a desired track on the magnetic disk 101 (refer to FIG. 3).

Figure 4:
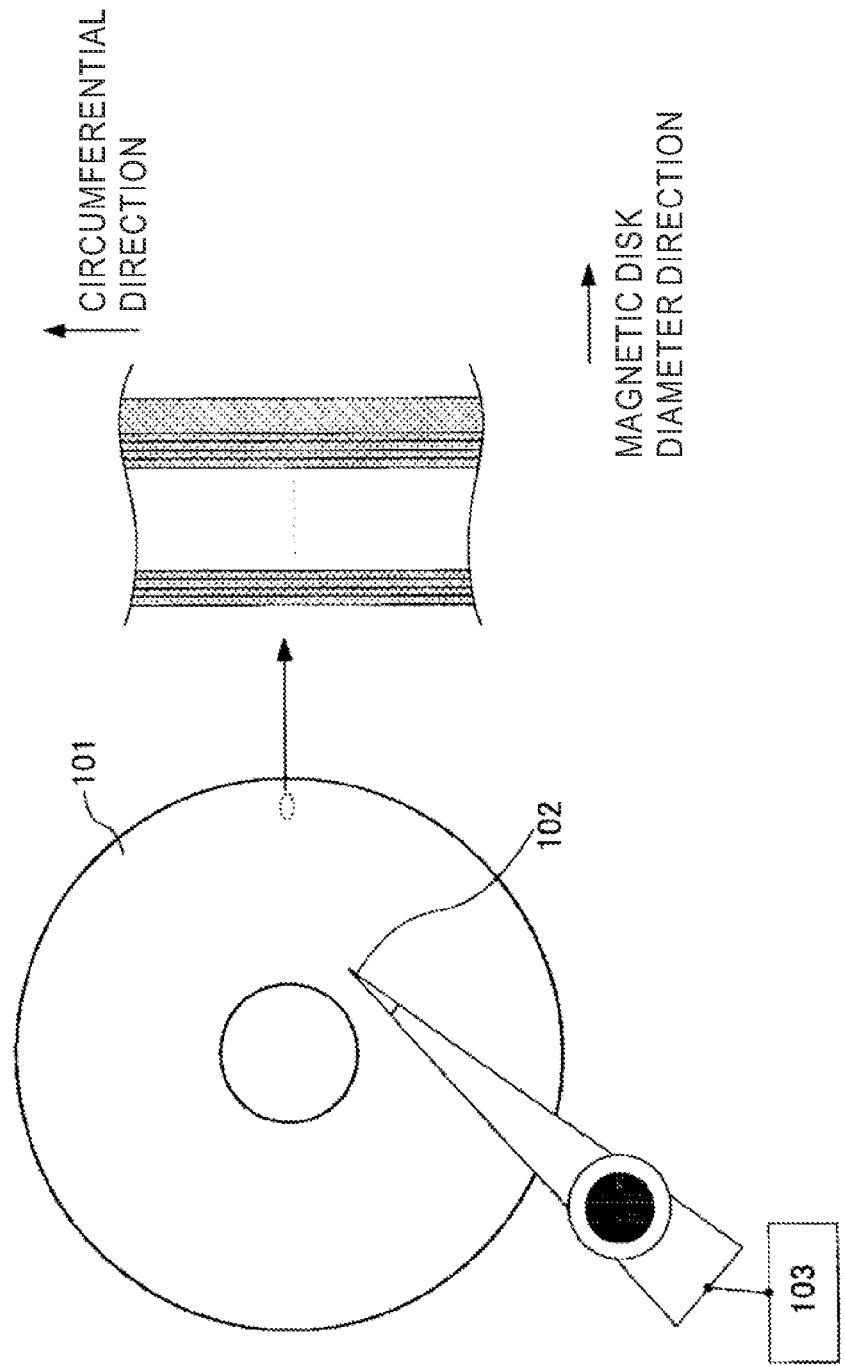
FIG. 4 A drawing that depicts an example of a magnetic disk device according to an embodiment of the present invention.

Next, the write operation of the magnetic disk device 100 shown in the present embodiment is described. As described above, the write operation of the recording head 102 onto the magnetic disk 101 is controlled by the control unit 103. Specifically, the control unit 103 controls the write operation of the recording head 102 onto the magnetic disk 101 so that the recording head 102 writes information in an overlapping manner in a region including part of an adjacent track as shifting a position in a radius direction of the magnetic disk 101 and writing is performed onto a track in which information is written last with a higher frequency compared with other tracks in which partial writing is performed in an overlapping manner (refer to FIG. 4). In FIG. 4, the overlapping write operation is performed from an inner edge to an outer edge side of the magnetic disk, but may be performed in reverse.

Figure 5:
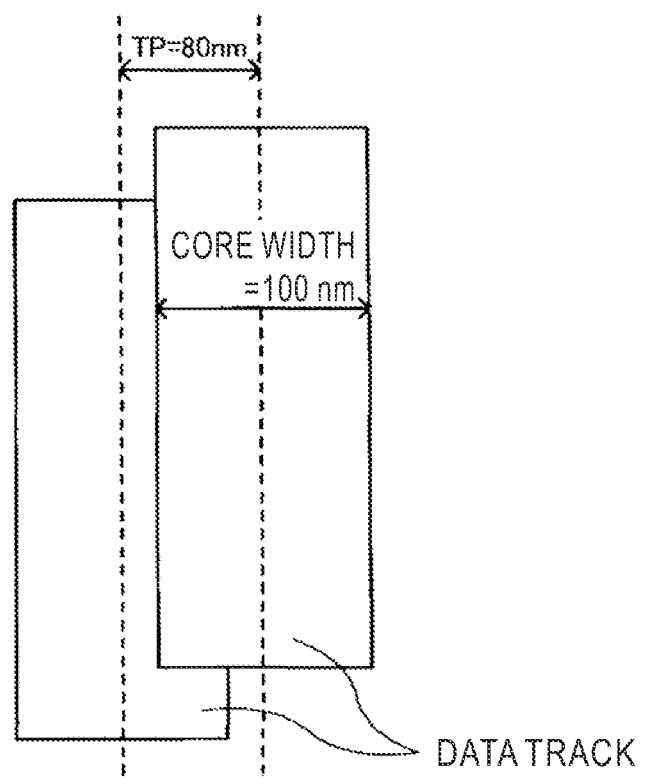
FIG. 5 A drawing for describing a core width and a track pitch of a magnetic head in a shingle recording type.

In this shingle recording type, as depicted in FIG. 5, the core width of the magnetic head is wider than the track pitch. In FIG. 5, the state is depicted in which the core width is 100 nm and a data track is written and then an adjacent track is then written at a position of TP=80 nm therefrom.

With this, by increasing TPI by using the shingle recording type and controlling the thickness of the soft magnetic ground layer in the perpendicular magnetic recording medium of the present invention, the bit curvature can be suppressed to increase BPI and therefore recording density can be increased in the magnetic disk as a whole.

Note that in the magnetic disk device of the present invention, at least part of a region of the magnetic disk 101 is written with the shingle recording type, and the structure does not necessarily have to be such that the entire surface of the magnetic disk 101 is written with the shingle recording type.

Figure 6:
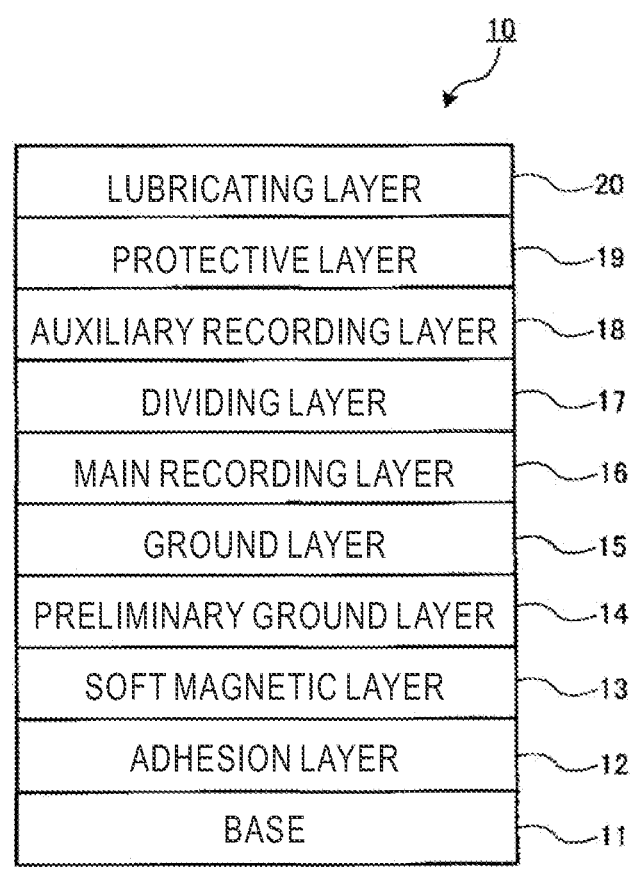
FIG. 6 A drawing that depicts an example of the structure of a perpendicular magnetic recording medium according to an embodiment of the present invention.

FIG. 6 is a drawing for describing the structure of a perpendicular magnetic recording medium 10 according to an embodiment of the present invention. The perpendicular magnetic recording medium 10 depicted in FIG. 6 has a laminated film including at least a magnetic layer on a base 11. The laminated film is mainly configured of an adhesion layer 12, a soft magnetic layer 13, a preliminary ground layer 14, a ground layer 15, a main recording layer 16, a dividing layer 17, an auxiliary recording layer 18, a protective layer 19, and a lubricating layer 20.

As the base 11, for example, a glass disk obtained by molding amorphous aluminosilicate glass in a disk shape by direct pressing can be used. Note that the type, size, thickness, and others of the glass disk are not particularly restricted. Examples of a material of the glass disk include, for example, aluminosilicate glass, soda lime glass, soda aluminosilicate glass, aluminoborosilicate glass, borosilicate glass, quartz glass, chain silicate glass, and glass ceramic such as crystallized glass. By sequentially grinding, polishing, and then chemically strengthening any of these glass disks, the flat, the non-magnetic base 11 formed of a chemically-strengthen glass disk can be obtained. Note that an aluminum base coated with a NiP electroless plating layer widely used like the glass disk may be used for the magnetic disk device.

On the base 11, films of the adhesion layer 12 to the auxiliary recording layer 18 are sequentially formed by DC magnetron sputtering, and a film of the protective layer 19 can be formed by CVD. Thereafter, the lubricating layer 20 can be formed by dip coating. The structure of each layer is described below.

The adhesion layer 12 is formed so as to be in contact with the base 11, and has a function of enhancing a close contact strength between the film of the soft magnetic layer (soft magnetic ground layer) 13 formed thereon and the base 11. The adhesion layer 12 is preferably an amorphous alloy film, such as a CrTi-base amorphous alloy, a CoW-base amorphous alloy, a CrW-base amorphous alloy, a CrTa-base amorphous alloy, or a CrNb-base amorphous alloy. The adhesion layer 12 can have a film thickness, for example, on the order of 2 nm to 20 nm. The adhesion layer 12 may be a single layer, and may be formed by laminating a plurality of layers.

The soft magnetic layer 13 functions as helping facilitate writing of a signal in the magnetic recording layer and increase density by convergence of a write magnetic field from the head when a signal is recorded with a perpendicular magnetic recording type. As a soft magnetic material, in addition to a cobalt-base alloy such as CoTaZr, a FeCo-base alloy such as FeCoCrB, FeCoTaZr, or FeCoNiTaZr, or a material showing a soft magnetic characteristic such as a FeCo-base alloy such as FeCoCrB, FeCoTaZr, or FeCoNiTaZr or a NiFe-base alloy can be used. Also, by interposing a spacer layer made of Ru in approximately the midpoint of the soft magnetic layer 13, the structure can be made to include AFC (Antiferro-magnetic exchange coupling). With this structure, perpendicular components of magnetization can be extremely reduced, and therefore noise occurring from the soft magnetic layer 13 can be reduced.

The thickness of the soft magnetic layer 13 is a thickness found from the core width of the magnetic head for recording and reproduction with respect to the perpendicular magnetic recording medium and the track pitch narrower than the core width. For example, the film thickness of the soft magnetic layer 13 is made thinner corresponding to an increase of the core width. As described above, since the magnetic head of the shingle recording type has a wider core width compared with the magnetic head of the conventional recording type, a sufficient overwrite (OW) characteristic can be obtained. Therefore, the OW characteristic can be ensured even the soft magnetic ground layer (SUL) is eliminated or made extremely thin. Also, in the perpendicular magnetic recording medium, by eliminating the soft magnetic ground layer thinner or making it extremely thin, as depicted in FIG. 1, the curvature of the track edge can be reduced and Spi-SNR (a recording and reproduction characteristic) can be improved.

The thickness of the soft magnetic ground layer is preferably thinner than a thickness of a soft magnetic ground layer of a perpendicular magnetic recording medium for use in a recording type with a track pitch wider than the core width of the magnetic head by 2×d×A (nm), wherein $d$=the core width of the magnetic head-$TP\_shingle$, $A=(Bs\_mp/Bs\_sul)\times(SUL\_conv/TP\_conv)$, wherein TP_shingle: the track pitch of the perpendicular magnetic recording medium for the shingle recording type Bs_mp: saturation magnetic flux density of a main pole of the perpendicular magnetic recording medium for the shingle recording type Bs_sul: saturation magnetic flux density of the soft magnetic ground layer of the perpendicular magnetic recording medium for the shingle recording type SUL_conv: a thickness of the soft magnetic ground layer required for saturation of Spi-SNR in the perpendicular magnetic recording medium for a recording type with the track pitch wider than the core width of the magnetic head TP_conv: the track pitch of the perpendicular magnetic recording medium for the recording type with the track pitch wider than the core width of the magnetic head.

For example, when the core width of the magnetic head: 100 nm; TP_Shingle: 80 nm; Bs_mp: 24 kG; Bs_sul: 12 kG; SUL_conv: 40 nm; and TP_conv: 80 nm, 2×d×A (nm)=40 nm, and therefore the film thickness of the soft magnetic ground layer can be made thin by 40 nm at maximum (that is, the soft magnetic ground layer can be eliminated).

In consideration of the above point, the soft magnetic ground layer preferably has a thickness equal to or smaller than 40 nm.

The preliminary ground layer 14 has a function of promoting crystal orientation of the ground layer 150 formed thereabove and a function of controlling a microfabricated structure, such as a particle diameter. The preliminary ground layer 140 preferably has a hcp structure or a face-centered cubic structure (a fcc structure) in which a (111) surface is parallel to a main surface of the base 11. Examples of the material of the preliminary ground layer 14 can include Ni, Cu, Pt, Pd, Ru, Co, and Hf, and an alloy having any of the above-described metals as a main component and having added thereto one or more of V, Cr, Mo, W, Ta, and others. Specifically, a selection can be suitably made from NiV, NiCr, NiTa, NiW, NiVCr, CuW, CuCr, and others. The preliminary ground layer 14 can have a film thickness on the order of 1 nm to 20 nm. Also, the preliminary ground layer 14 may have a laminated structure.

The ground layer 15 is a layer having a hcp structure, having a function of promoting crystal orientation of magnetic crystal particles in the hcp structure of the main recording layer 16 formed thereabove and a function of controlling microfabricated structure, such as a particle diameter, and serving as a so-called basis of a granular structure of the main recording layer. Ru has a hcp structure as that of Co, and a lattice space of the crystal is similar to that of Co. Therefore, magnetic particles having Co as a main component can be oriented in good condition. Therefore, as crystal orientation of the ground layer 15 is higher, crystal orientation of the main recording layer 16 can be improved. Also, by microfabricating the particle diameter of the ground layer 15, the particle diameter of the main recording layer can be microfabricated. While a typical material of the ground layer 15 is Ru, a metal, such as Cr or Co, or an oxide can further be added. The ground layer 15 can have a film thickness of, for example, on the order of 5 nm to 40 nm.

Also, by changing gas pressure at the time of sputtering, the ground layer 15 may be formed in a two-layer structure. Specifically, if Ar gas pressure is increased in the case of forming an upper layer side of the ground layer 15 compared with the case of forming a lower layer side, the particle diameter of the magnetic particles can be microfabricated while crystal orientation of the upper main recording layer 16 is kept in good condition.

The main recording layer (magnetic layer) 16 has a magnetic material having a granular structure. That is, the main recording layer (magnetic layer) 16 has a granular structure in a columnar shape in which a non-magnetic substance is segregated around magnetic particles with ferromagnetic properties having a CoCrPt-base alloy as a main component to form a grain boundary.

Note that the substance for use in the main recording layer 16 described above is merely an example, and is not restrictive. As a CoCrPt-base alloy, an alloy obtained by adding one or more types of B, Ta, Cu, and others to CoCrPt may be used.

The dividing layer 17 is provided between the main recording layer 16 and the auxiliary recording layer 18, and has an action of adjusting the strength of exchange coupling between these layers. With this, the strength of magnetic coupling acting between the main recording layer 16 and the auxiliary recording layer 18 and between adjacent magnetic particles in the main recording layer 16 can be adjusted. With this, while magnetostatic values, such as a coercive force (Hc) and an inverted-magnetic-domain nucleation magnetic field (Hn), relating to heat fluctuation resistance are kept, recording and reproduction characteristics, such as an overwrite characteristic and an SNR characteristic, can be improved.

The dividing layer 17 is preferably a layer having a hcp crystal structure and having Ru or Co as a main component so as not to decrease inheritance of crystal orientation. As a Ru-base material, in addition to Ru, a material obtained by adding another metal element, oxygen, or an oxide to Ru can be used. Also, as a Co-base material, a CoCr alloy or the like can be used. Specific examples include Ru, RuCr, RuCo, Ru—$SiO_2$, Ru—$WO_3$, Ru—$TiO_2$, CoCr, CoCr—$SiO_2$, CoCr—$TiO_2$, or the like can be used. Note that a non-magnetic material is normally used for the dividing layer 17, but the dividing layer 17 may have low magnetic properties. Furthermore, in order to obtain excellent exchange coupling strength, the dividing layer 17 may preferably have a film thickness within 0.2 nm to 1.0 nm.

The auxiliary recording layer 18 is a magnetic layer magnetically approximately continuous in an in-plane direction of a main surface of the base. Since the auxiliary recording layer 18 has a magnetic interaction (exchange coupling) with respect to the main recording layer 16, magnetostatic characteristics, such as the coercive force (Hc) and the inverted-magnetic-domain nucleation magnetic field (Hn), can be adjusted. With this, an object is to improve heat fluctuation resistance, an OW (overwrite) characteristic, and an SNR. As a material of the auxiliary recording layer 18, a CoCrPt-base alloy can be used and, furthermore, an additive, such as B, Ta, Cu, or the like, may be added. Specifically, CoCrPt, CoCrPtB, CoCrPtTa, CoCrPtCu, CoCrPtCuB, and others can be used. Furthermore, the auxiliary recording layer 18 can have a film thickness of, for example, 3 nm to 10 nm.

Note that "magnetically continuous" means that magnetic properties continue without interruption. "Approximately continuous" means that the auxiliary recording layer 18 is not necessarily a single magnet when observed as a whole but the magnetic properties may be partially discontinuous. That is, the auxiliary recording layer 18 can have continuous magnetic properties across (so as to cover) a collective body of a plurality of magnetic particles. As long as this condition is satisfied, the auxiliary recording layer 18 may have a structure in which, for example, Cr is segregated.

The protective layer 19 is a layer for protecting the perpendicular magnetic recording medium 10 from a shock from the magnetic head and corrosion. The protective layer 19 can be formed by forming a film containing carbon by CVD. In general, a carbon film formed by CVD has an improved film hardness compared with a film formed by sputtering, and therefore is suitable because it can more effectively protect the perpendicular magnetic recording medium 10 from a shock from the magnetic head. The protective layer 19 can have a film thickness of, for example, 1 nm to 6 nm.

The lubricating layer 20 is formed so as to prevent damage on the protective layer 19 when the magnetic head makes contact with the surface of the perpendicular magnetic recording medium 10. For example, a film can be formed by applying PFPE (perfluoropolyether) by dip coating. The lubricating layer 20 can have a film thickness of, for example, 0.5 nm to 2.0 nm.

Next, examples performed to clarify the effect of the present invention are described.

Example 1

Amorphous aluminosilicate glass was molded into a disk shape by direct press to create a glass disk. Then, by sequentially grinding, polishing, and then chemically strengthening this glass disk, a smooth non-magnetic disk substrate made of the chemically-strengthened glass disk was obtained. The base for a 2.5-inch type magnetic disk has a diameter of 65 mm, an inner diameter of 20 mm, and a disk thickness of 0.8 mm. When the surface roughness of the obtained base was observed with an AFM (atomic force microscope), it was confirmed that Ra has a smooth surface of 0.15 nm. Note that Ra complies with Japanese Industrial Standards (JIS).

Next, on the base 11, by using a vacuumed film forming device, films of the adhesion layer 12, the soft magnetic layer 13, the preliminary ground layer 14, the ground layer 15, the main recording layer 16, the dividing layer 17, and the auxiliary recording layer 18 were sequentially formed in an Ar atmosphere by DC magnetron sputtering. Note that the Ar gas pressure at the time of film formation is 0.6 Pa unless otherwise specified.

Specifically, for the adhesion layer 120, a film was formed of Cr-50Ti so as to have a thickness of 10 nm. For the soft magnetic layer 13, a film was formed of 92(40Fe-30Ni-30Co)-3Ta-5Zr (Bs=12 kG) so as to have a thickness of 0 nm to 80 nm. For the preliminary ground layer 14, a film was formed of Ni-5W so as to have a thickness of 8 nm. For the ground layer 15, a film was formed of Ru so as to have a thickness of 10 nm and then a film was formed thereon of Ru at 5 Pa of Ar gas pressure so as to have a thickness of 10 nm. For the main recording layer 16, a film was formed of 90(70Co-10Cr-20Pt)-10($Cr_2O_3$) at 3 Pa of Ar gas pressure so as to have a thickness of 2 nm and then a film was formed thereon of 92(72Co-10Cr-18Pt)-8$SiO_2$ at 3 Pa of Ar gas pressure so as to have a thickness of 12 nm. For the dividing layer 17, a film was formed of Ru so as to have a thickness of 0.3 nm. For the auxiliary recording layer 18, a film was formed of 62Co-18Cr-15Pt-5B so as to have a thickness of 6 nm.

On the auxiliary recording layer 18, a film was formed by using $C_2H_4$ by CVD to form the protective layer 19 with a thickness of 4.0 nm, and then its surface layer was nitrided. Next, the lubricating layer 20 was formed by using PFPE (perfluoropolyether) by dip coating so as to have a thickness of 1 nm. As such, by using the fabricated perpendicular magnetic recording medium, evaluation of the shingle recording type was conducted. When the magnetic characteristics of this perpendicular magnetic recording medium were measured by an evaluating device using the magnetic Kerr effect, Hc and Hcn were 5500 oersteds ($10^3/4\pi$A/m) and −2800 oersteds, respectively.

Comparative Example

By using the perpendicular magnetic recording medium fabricated in the example 1, evaluation was conducted with the conventional recording type.

Figure 7:
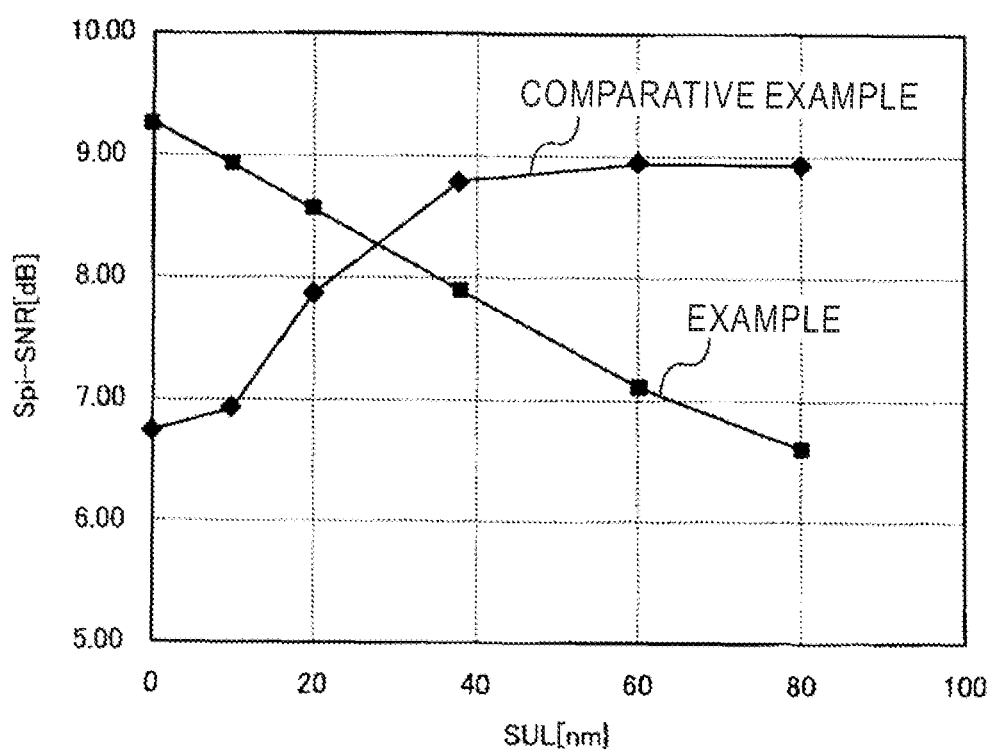
FIG. 7 A drawing that depicts a relation between the thickness of a soft magnetic ground layer and Spi-SNR.

For each of the shingle recording of the example 1 and the conventional recording type of a comparative example, Spi-SNR was examined. The results are shown in FIG. 7. Note that Spi-SNR represents a ratio between a signal and noise found by using the following equation:

$$\text{Spi-SNR} = 20 \times \log(\text{signal/noise}).$$

Here, the signal represents a voltage output component (effective value) of a recording frequency f/2 (f is a maximum recording frequency) at the time of writing with this frequency, noise represents a sum of effective values of circuit noise, head noise, and medium noise, and a integration frequency band is set from DC to the maximum recording frequency f. Here, for the perpendicular magnetic recording medium of the example 1, a magnetic head with a write width: 100 nm and a read width: 50 nm was used, and measurement was performed with the shingle recording type. For the perpendicular magnetic recording medium of the comparative example, a head with a write width: 80 nm and a read width: 50 nm, that is, the head with a narrower write width compared with the example 1, was used, and measurement was performed with the conventional recording type.

Figure 8:
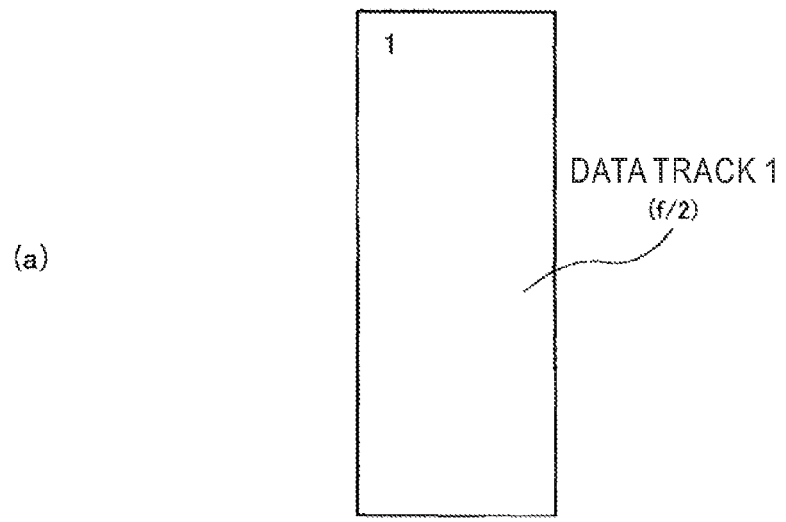
FIGS. 8 (a) and (b) are drawings for describing a measuring procedure of Spi-SNR.
Figure 8:
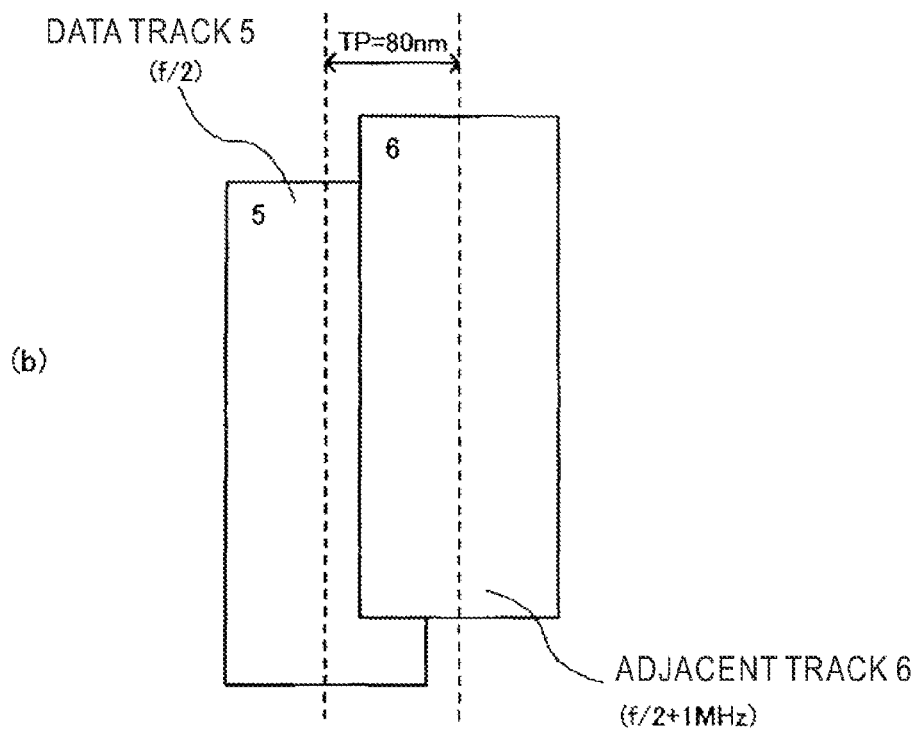

The procedure of measuring Spi-SNR at the time of conventional recording is such that, as depicted in FIG. 8(a), a data track 1 is written, and its signal component and noise component are measured. The measuring procedure at the time of shingle recording is such that, as depicted in FIG. 8(b), a data track 5 is written, an adjacent track 6 is written at a position of TP=80 nm therefrom, and then the signal component and noise component of the data track 5 at a peak position at the time of measuring an off-track profile are measured.

Each of the magnetic head for shingle recording and the conventional magnetic head is a trailing-shield-type head depicted in FIG. 2. A gap (a write gap) between a trailing edge of the main magnetic pole and a reading edge of a shield is considered to be approximately 30 nm on the analogy of the generation of the head. Note that in the shingle recording and the conventional recording types, the track pitch (TP) is set at 80 nm, and writing in an overlapping manner is performed for 20 nm in shingle recording. Also, the number of revolutions is 5400 rpm, the diameter is 21.08 mm, the skew is 0 degree, the recording current is 30 mA, and the maximum recording frequency is 382.7 MHz.

As can be seen from FIG. 7, in the results of shingle recording of the example 1, Spi-SNR was higher as the thickness of the soft magnetic layer 13 was thinner. That is, it can be found that in shingle recording, the recording and reproduction characteristic is better as the thickness of the soft magnetic layer 13 of the perpendicular magnetic recording medium (the example 1) is thinner. The reason for this can be thought such that, as depicted in FIG. 1 and FIG. 2, as the thickness of the soft magnetic layer 13 is thinner, the curvature of the track edge is reduced to reduce an erase band and edge noise. On the other hand, it was found in the conventional recording type of the comparative example that as the thickness of the soft magnetic layer 13 is thinner, Spi-SNR is lower and the recording and reproduction characteristic is degraded.

Figure 9:
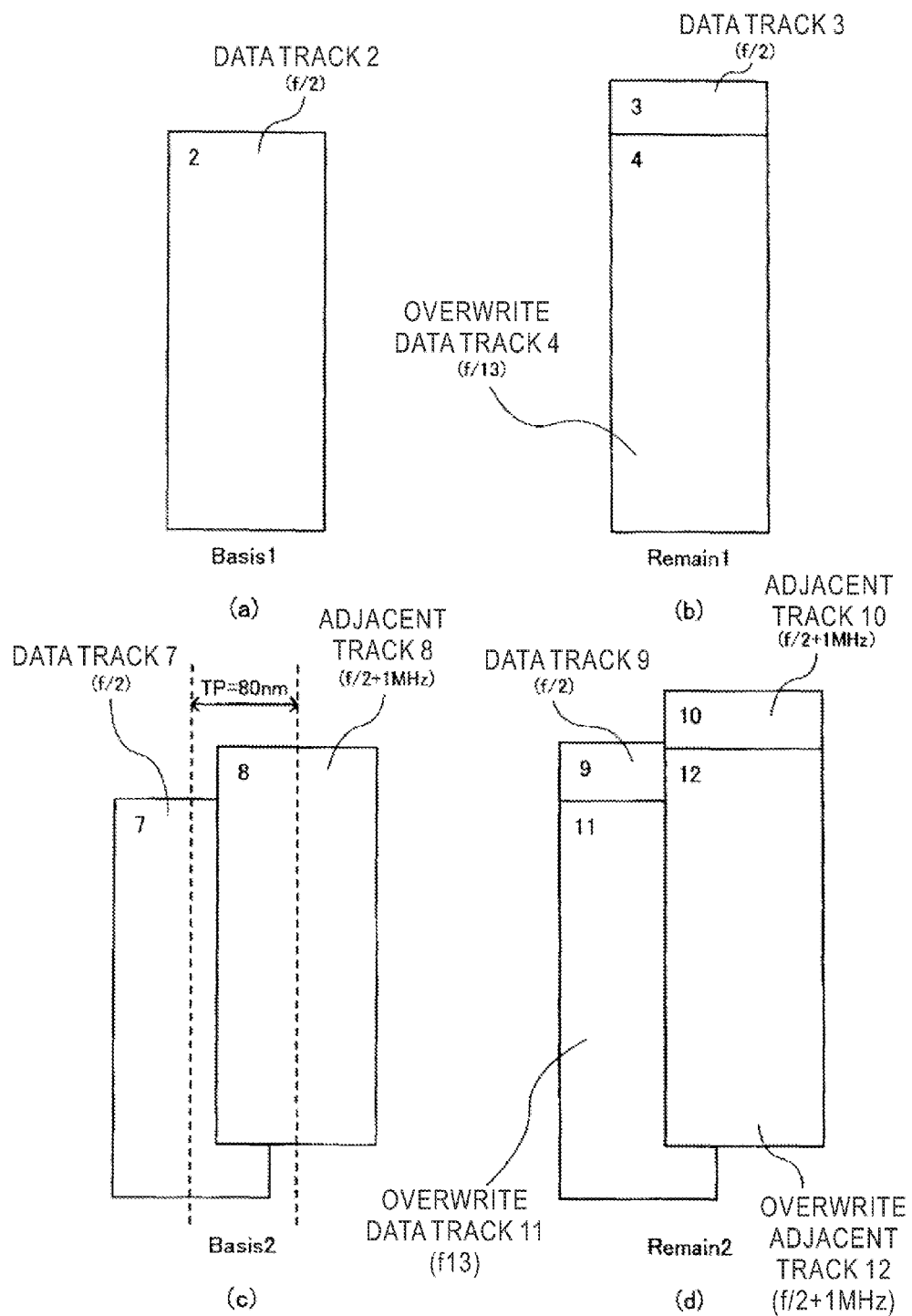
FIG. 9 (a) to (d) are drawings for describing a measuring procedure of OW2.

Also, for each of the perpendicular magnetic recording medium of the example 1 and the perpendicular magnetic recording medium of the comparative example, its overwrite characteristic was examined. The procedure of measuring OW2 at the time of conventional recording is such that, as depicted in FIG. 9(a), a data track 2 is written and its signal component is taken as Basis1 and, after erase is performed once, as depicted in FIG. 9(b), a data track 3 is written. Then, an overwrite data track 4 is overwritten thereon, the signal component (the remaining component without disappearing) of the data track 3 is measured and taken as Remain1. The measuring procedure at the time of shingle recording is such that, as depicted in FIG. 9(c), a data track 7 is written, an adjacent track 8 is written at a position of TP=80 nm therefrom, and then the signal component of the data track 7 at a peak position at the time of measuring a track profile is measured and taken as Basis2. Then, after erase is performed once, as depicted in FIG. 9(d), a data track 9 is written, and an adjacent track 9 is written at a position of TP=80 nm therefrom. Next, an overwrite data track 11 is overwritten on the data track 9, and an overwrite adjacent track 12 is overwritten at a position of TP=80 nm therefrom. Then, the signal component (the remaining component without disappearing) of the data track 9 at the same position as that of Basis2 is measured and taken as Remain2. By using Basis1 and Basis2 and Remain1 and Remain2 found in each of the conventional recording and shingle recording, overwrite characteristics are found with the following equations.

Conventional recording: $OW2=20 \log(Remain1/Basis1)$ [dB]

Shingle recording: $OW2=20 \log(Remain2/Basis2)$ [dB]

Figure 10:
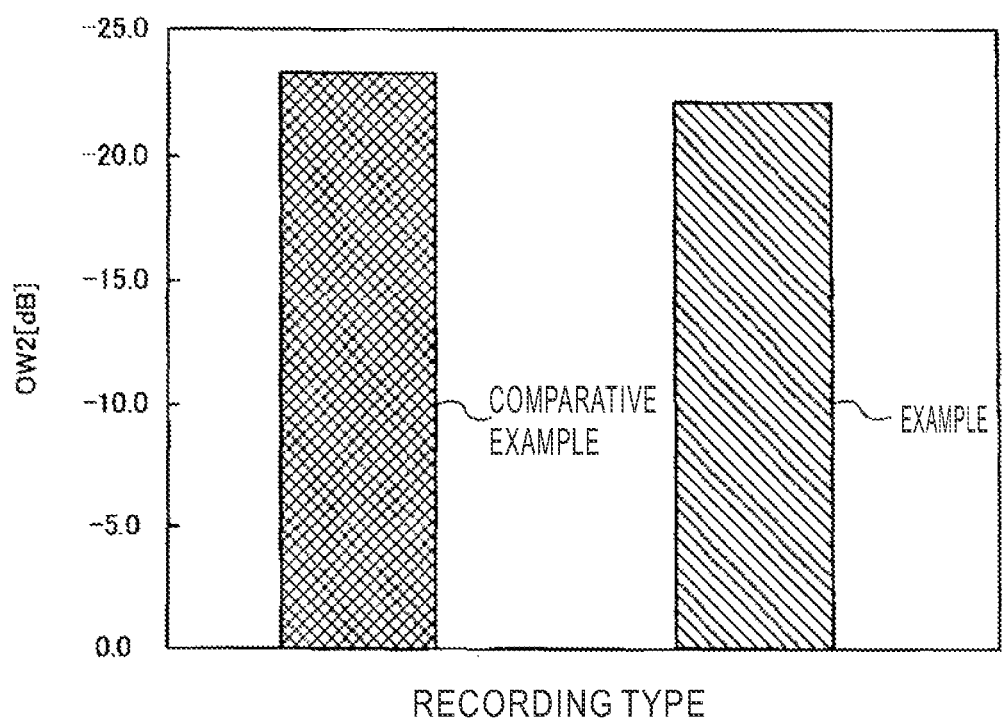
FIG. 10 A drawing that depicts a difference in OW characteristic depending on the recording type.

The results are shown in FIG. 10. An overwrite characteristic (OW2) of the perpendicular magnetic recording medium for a shingle recording type without provision of the soft magnetic layer 13 (a film thickness of 0 nm) was with approximately the same degree as that of an overwrite characteristic (OW2) of the perpendicular magnetic recording medium for a convention recording type with a film thickness of the soft magnetic layer 13 being 40 nm.

Figure 11:
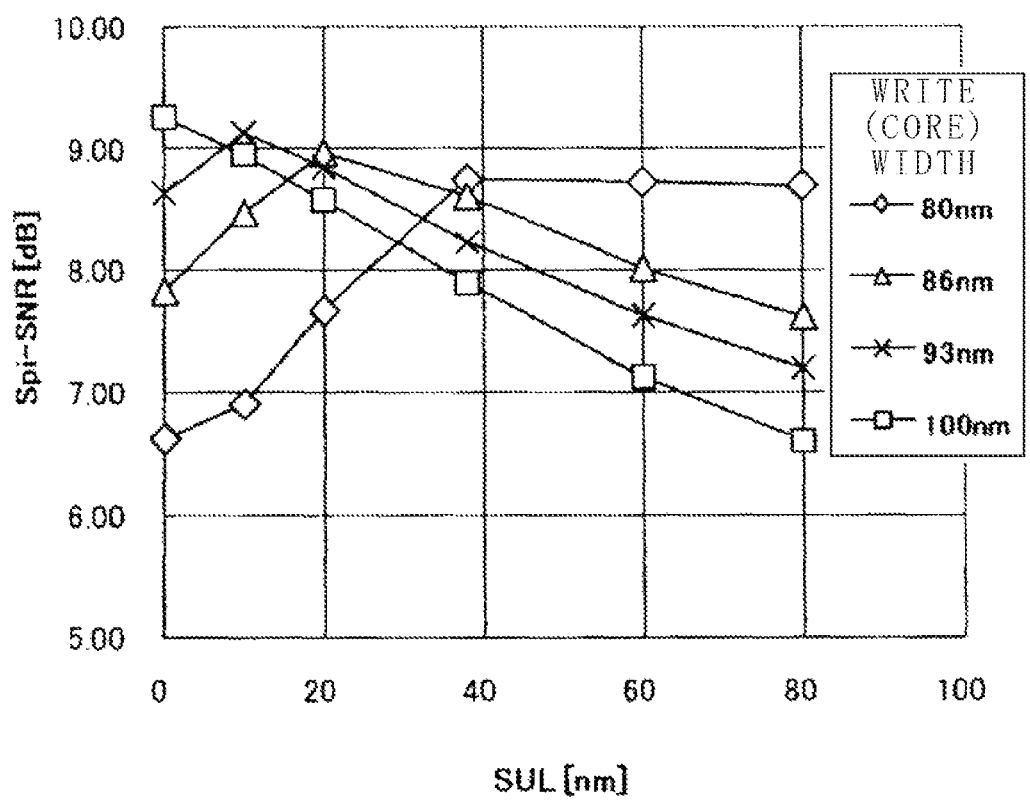
FIG. 11 A drawing that depicts a relation between the thickness of the soft magnetic ground layer and Spi-SNR.

Here, with the track pitch (TP_shingle) for shingle recording being set at 80 nm, evaluations of shingle recording were conducted by using magnetic heads shown in Table 1 to examine a condition of optimizing Spi-SNR of the thickness of the soft magnetic ground film in shingle recording. The results ware shown in FIG. 11. As can be seen from FIG. 11, as d=the core width (write width) of the magnetic head-TP_shingle is larger, the peak value of Spi-SNR is shifted more to a thin SUL side. Therefore, it can be thought that the optimum film thickness of the soft magnetic ground layer can be made thinner as d is larger. This relation is represented by a relation of $2 \times d \times (Bs\_mp/Bs\_sul) \times (SUL\_conv/TP\_conv)$.

Each value at this time is as follows.
Bs_mp=24 kG
Bs_sul=12 kG
SUL_conv=40 nm
TP_conv=80 nm

TABLE 1

|  | WRITE WIDTH [nm] | READ WIDTH [nm] |
| --- | --- | --- |
| Head #1 | 80 | 50 |
| Head #2 | 86 | 52 |
| Head #3 | 93 | 51 |
| Head #4 | 100 | 50 |

Example 2

In recent years, a thermomagnetic recording type has attract attention in which, in a process of writing a magnetic bit, magnetic recording information with high density is stably recorded by heating a magnetic recording medium with a laser or the like. In the thermomagnetic recording type, a magnetic recording medium with Hc higher than that of a conventional magnetic recording medium is used. Since high Hc means high magnetic energy of magnetic particles forming a magnetic layer of the magnetic recording medium, a feature is that an influence of an environmental temperature at which the magnetic disk device is used, that is, thermal energy, is not prone to have influence and the recorded information is stably held over a long period of time. On the other hand, due to high Hc, bit write with the magnetic head cannot be performed unless any change is made. Therefore, at the time of writing a bit, heating is performed with a laser or the like from outside to decrease Hc, thereby allowing a bit to be written. This is described in IEEE TRANSACTIONS ON MAGNETICS, Vol. 44, No. 1, JANUARY 2008, pp. 119-124. In the magnetic recording type described in this document, however, the width of the magnetic bit is narrower than the track pitch and shingle recording is not used.

Considering that, for the magnetic recording medium of the embodiment of the example 1, there may be a condition of optimizing the SUL thickness in shingle recording also in the thermomagnetic recording type in view of the relation between the write core width of the magnetic head and the track pitch, the inventors have studied the condition.

The structure of the magnetic recording medium is similar to that of the example 1 and FIG. 6. However, to increase Hc, for the ground layer 15, a film was formed of Ru so as to have a thickness of 12 nm, and then a film was formed thereon of Ru at 5 Pa of Ar gas pressure so as to have a thickness of 15 nm. Furthermore, for the main recording layer 16, a film was formed of $90(70Co-10Cr-20Pt)-10(Cr_2O_3)$ at 3 Pa of Ar gas pressure so as to have a thickness of 3 nm, and then a film was further formed thereon of $92(72Co-4Cr-24Pt)-8SiO_2$ at 3 Pa of Ar gas pressure so as to have a thickness of 12 nm. For the dividing layer 17, a film was formed of Ru so as to have a thickness of 0.35 nm. For the auxiliary recording layer 18, a film was formed of 62Co-16Cr-17Pt-5B so as to have a film thickness of 6 nm.

The magnetic characteristics of this perpendicular magnetic recording medium was measured by an evaluating device using the magnetic Kerr effect, Hc and Hcn were 7200 oersteds and −4200 oersteds, respectively. Note that as the base 11, an aluminosilicate glass base having a diameter of 2.5 inches and a thickness of 0.8 mm was used. Also, due to the heating mechanism, the magnetic recording medium was formed only on one side of the base 11.

Figure 3:
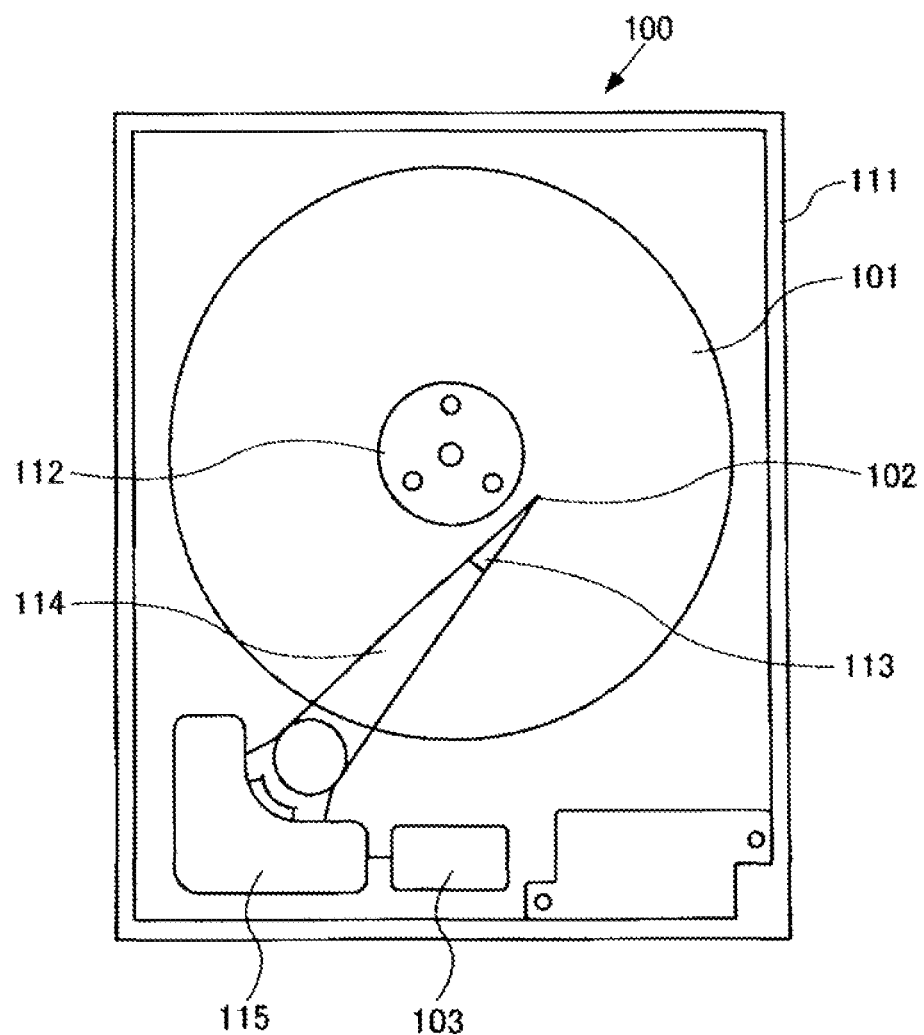
FIG. 3 A drawing that depicts an example of the entire structure of a magnetic disk device according to an embodiment of the present invention.
Figure 12:
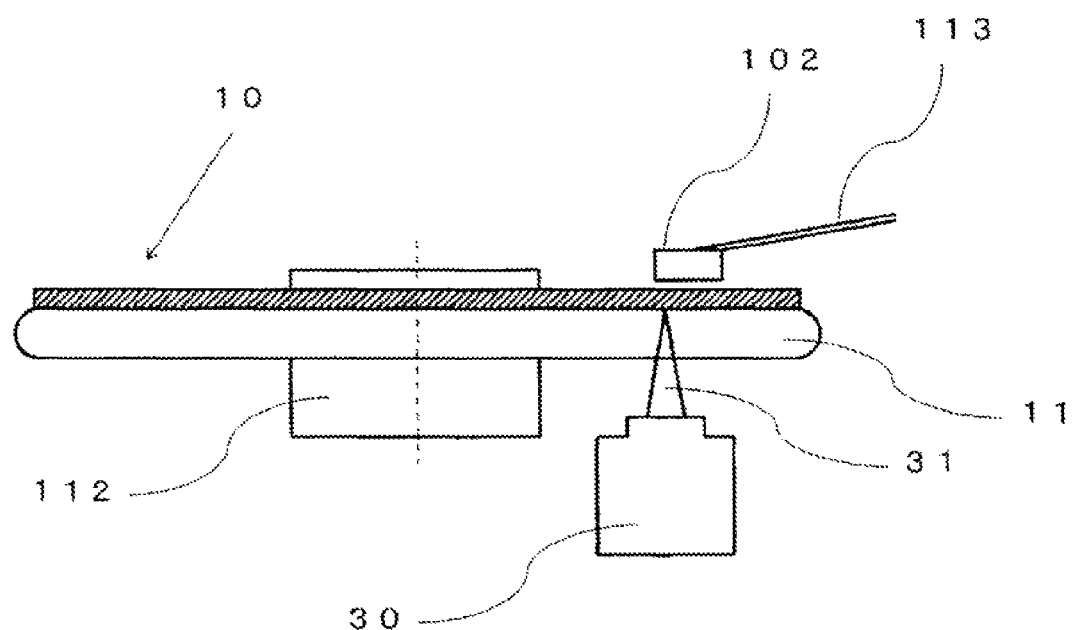
FIG. 12 A drawing of a magnetic disk device including a medium heating mechanism.

The structure of a magnetic disk device for use in writing a magnetic bit in this magnetic recording medium while heating is depicted in FIG. 12. In FIG. 12, portions identical to those of FIG. 3 are provided with the same reference numerals and are not described in detail herein. In FIG. 12, a perpendicular magnetic recording medium 10 is formed by forming a laminated film on one surface of a transparent glass base 11. A reference numeral 30 denotes a laser for heating and convergent optical system in a magneto-optical recording device. With the laser for heating and convergent optical system 31, the perpendicular magnetic recording medium 10 is heated when writing a recording bit. Also, a reference numeral 31 denotes an converged optical path of the laser. As evident from FIG. 12, the perpendicular magnetic recording medium is heated through the transparent glass base from a side opposite to the surface of the magnetic head 102 for recording and reproduction when a magnetic bit is written by the laser.

Figure 13:
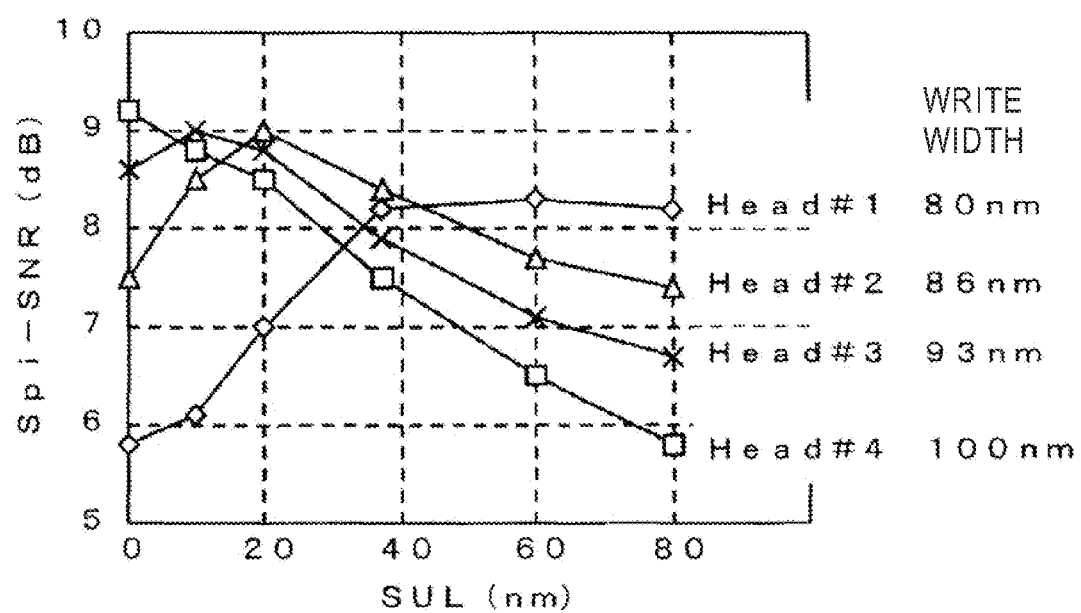
FIG. 13 A drawing that depicts a relation between the thickness of the soft magnetic ground layer and Spi-SNR.

Here, with the track pitch (TP_shingle) for shingle recording being set at 80 nm, evaluations of shingle recording were conducted by using magnetic heads shown in Table 1 to examine a condition of optimizing Spi-SNR of the thickness of the soft magnetic ground film in shingle recording. The results ware shown in FIG. 13. Note that the recording and reproduction condition for use in obtaining the results of FIG. 13 is the same as that described in the example 1 and the comparative example except that the medium is heated at the time of writing a magnetic bit. As can be seen from FIG. 13, as d=the core width (write width) of the magnetic head-TP_shingle is larger, the peak value of Spi-SNR is shifted more to a thin SUL side. Therefore, it can be thought that the optimum film thickness of the soft magnetic ground layer can be made thinner as d is larger. This relation is represented by a relation of 2×d×(Bs_mp/Bs_sul)×(SUL_conv/TP_conv).

Each value at this time is as follows.

Bs_mp=24 kG
Bs_sul=12 kG
SUL_conv=40 nm
TP_conv=80 nm

Note that in FIG. 13 that under the recording and reproducing conditions in which Spi-SNR is equal to or larger than 8 dB, overwrite (OW) equal to or larger than 22 dB was observed and it was confirmed that magnetic-bit overwrite was sufficiently performed.

It is difficult to specifically know the heating temperature of the magnetic recording medium because the converging laser spot is very small and due to the structure of the device. However, since Hc of the recording medium of the example 2 was decreased by approximately 13 oersteds with respect to a temperature increase of 1 degree Celsius and similar overwrite (OW) was observed in the example 2 and the example 1, it is estimated that the perpendicular magnetic recording medium is heated to approximately 150 degrees Celsius in a region where the recording magnetic field of the head operates.

Note that while a laser is used to heat the perpendicular magnetic recording medium in this example, another heating means may be used as means for decreasing Hc at the time of magnetic-bit writing.

The present invention is not restricted to the above embodiment, the example 1, and the example 2, and can be implemented as appropriately changed. For example, the size, process procedure, and others in the above embodiment are shown merely by way of example, and can be implemented as variously changed within a range of achieving the effects of the present invention. In addition, implementation can be made with appropriate changes as long as it does not deviate from the range of the object of the present invention.

INDUSTRIAL APPLICABILITY

The present invention can be applied to a perpendicular magnetic recording medium and a magnetic disk device for a shingle recording type.

DESCRIPTION OF REFERENCE NUMERALS

| | |
|---|---|
| 10 | perpendicular magnetic recording medium |
| 11 | base |
| 12 | adhesion layer |
| 13 | soft magnetic layer |
| 14 | preliminary ground layer |
| 15 | ground layer |
| 16 | main recording layer |
| 17 | dividing layer |
| 18 | auxiliary recording layer |
| 19 | protective layer |
| 20 | lubricating layer |
| 30 | laser for heating and convergent optical system |
| 31 | converged optical path of the laser |
| 101 | magnetic disk |
| 102 | recording head |
| 103 | control unit |
| 111 | casing |
| 112 | spindle motor |
| 113 | suspension |
| 114 | head arm |
| 115 | voice coil motor |

The invention claimed is:

1. A perpendicular magnetic recording medium for a shingle-type recording by a magnetic head, comprising:
   a base; and
   a laminated film including a soft magnetic ground layer and a recording layer formed on the base,
   wherein, the soft magnetic ground layer has a thickness in a range of more than 0 nm to 40 nm and the thickness is based upon a core width of the magnetic head for recording and reproduction with respect to the perpendicular magnetic recording medium, and the perpendicular magnetic recording medium has a track pitch narrower than the core width of the magnetic head.

2. The perpendicular magnetic recording medium according to claim 1, wherein
   the perpendicular magnetic recording medium is a medium for thermomagnetic recording.

3. A perpendicular magnetic recording medium for a shingle recording type having a laminated film including a soft magnetic ground layer and a recording layer formed on a base, the soft magnetic ground layer having a thickness based upon a core width of a magnetic head for recording and reproduction with respect to the perpendicular magnetic recording medium and a track pitch narrower than the core width, wherein
   the thickness of the soft magnetic ground layer is thinner than a thickness of a soft magnetic ground layer of a perpendicular magnetic recording medium for use in a recording type with a track pitch wider than the core width of the magnetic head by 2×d×A (nm), wherein, $d$=the core width of the magnetic head-$TP$_shingle, and $A=(Bs\_mp/Bs\_sul)\times(SUL\_\mathrm{conv}/TP\_\mathrm{conv})$, wherein,
   TP_shingle: the track pitch of the perpendicular magnetic recording medium for the shingle recording type;
   Bs_mp: saturation magnetic flux density of a main pole of the perpendicular magnetic recording medium for the shingle recording type;
   Bs_sul: saturation magnetic flux density of the soft magnetic ground layer of the perpendicular magnetic recording medium for the shingle recording type;
   SUL_conv: a thickness of the soft magnetic ground layer required for saturation of Spi-SNR in the perpendicular magnetic recording medium for a recording type with the track pitch wider than the core width of the magnetic head; and
   TP_conv: the track pitch of the perpendicular magnetic recording medium for the recording type with the track pitch wider than the core width of the magnetic head.

4. A magnetic disk device comprising:
   the perpendicular magnetic recording medium according to claim 1,
   a magnetic head for writing information in the perpendicular magnetic recording medium, and a control unit for controlling a write operation on the perpendicular magnetic recording medium of the magnetic head.

5. A magnetic disk device comprising:

a perpendicular magnetic recording medium having a soft magnetic ground layer, a magnetic head for writing information in the perpendicular magnetic recording medium, and a control unit for controlling a write operation on the perpendicular magnetic recording medium of the magnetic head, wherein a core width of the magnetic head is wider than a track pitch of the perpendicular magnetic recording medium, and the soft magnetic ground layer has a thickness based upon a core width of the magnetic head and a track pitch narrower than the core width, wherein the thickness of the soft magnetic ground layer is thinner than a thickness of a soft magnetic ground layer of a perpendicular magnetic recording medium for use in a recording type with a track pitch wider than the core width of the magnetic head by $2 \times d \times A$ (nm), wherein, $d$ = the core width of the magnetic head - $TP\_shingle$, and $$A = (Bs\_mp/Bs\_sul) \times (SUL\_conv/TP\_conv),$$

wherein,

TP_shingle: the track pitch of the perpendicular magnetic recording medium for the shingle recording type;

Bs_mp: saturation magnetic flux density of a main pole of the perpendicular magnetic recording medium for the shingle recording type;

Bs_sul: saturation magnetic flux density of the soft magnetic ground layer of the perpendicular magnetic recording medium for the shingle recording type;

SUL_conv: a thickness of the soft magnetic ground layer required for saturation of Spi-SNR in the perpendicular magnetic recording medium for a recording type with the track pitch wider than the core width of the magnetic head; and TP_conv: the track pitch of the perpendicular magnetic recording medium for the recording type with the track pitch wider than the core width of the magnetic head.

6. The magnetic disk device according to claim 5, wherein heating means is included that heats the perpendicular magnetic recording medium before writing of a recording bit.

7. The perpendicular magnetic recording medium according to claim 3, wherein the perpendicular magnetic recording medium is a medium for thermomagnetic recording.

8. A magnetic disc apparatus comprising:

a magnetic head for recording and reproduction, and a perpendicular magnetic recording medium for a shingle-type recording by the magnetic head, said magnetic recording medium comprising:

a base; and a laminated film including a soft magnetic ground layer and a recording layer formed on the base, wherein, the soft magnetic ground layer has a thickness based upon a core width of the magnetic head with respect to the perpendicular magnetic recording medium and has a track pitch narrower than the core width, wherein, the thickness of the soft magnetic ground layer is thinner than a thickness of a soft magnetic ground layer of a perpendicular magnetic recording medium for use in a recording type with a track pitch wider than the core width of the magnetic head by $2 \times d \times A$ (nm), wherein, $d$ = the core width of the magnetic head - $TP\_shingle$, and $$A = (Bs\_mp/Bs\_sul) \times (SUL\_conv/TP\_conv),$$

wherein,

TP_shingle: the track pitch of the perpendicular magnetic recording medium for the shingle recording type;

Bs_mp: saturation magnetic flux density of a main pole of the perpendicular magnetic recording medium for the shingle recording type;

Bs_sul: saturation magnetic flux density of the soft magnetic ground layer of the perpendicular magnetic recording medium for the shingle recording type;

SUL_conv: a thickness of the soft magnetic ground layer required for saturation of Spi-SNR in the perpendicular magnetic recording medium for a recording type with the track pitch wider than the core width of the magnetic head; and TP_conv: the track pitch of the perpendicular magnetic recording medium for the recording type with the track pitch wider than the core width of the magnetic head.

* * * * *